(12) United States Patent
Poplin et al.

(10) Patent No.: US 7,187,405 B2
(45) Date of Patent: Mar. 6, 2007

(54) AUTOMATIC FLICKER FREQUENCY DETECTION DEVICE AND METHOD

(75) Inventors: Dwight Poplin, Corvallis, OR (US); Michael J. Zelman, Corvallis, OR (US); Airell R. Clark, II, Albany, OR (US); Todd S. Sachs, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1131 days.

(21) Appl. No.: 09/969,040

(22) Filed: Oct. 2, 2001

(65) Prior Publication Data

US 2004/0201729 A1  Oct. 14, 2004

(51) Int. Cl.
*H04N 9/73* (2006.01)
(52) U.S. Cl. .................. 348/226.1; 348/227.1
(58) Field of Classification Search ............. 348/222.1, 348/226.1, 227.1, 228.1, 223.1, 362
See application file for complete search history.

(56) References Cited

U.S. PATENT DOCUMENTS

| | | | |
|---|---|---|---|
| 4,774,588 A | 9/1988 | Noda et al. | 358/213.19 |
| 5,099,329 A * | 3/1992 | Oyama et al. | 348/620 |
| 5,128,708 A | 7/1992 | Murayama et al. | 354/430 |
| 5,960,153 A | 9/1999 | Oster et al. | 386/117 |
| 6,104,831 A | 8/2000 | Ruland | 382/173 |
| 6,271,884 B1 | 8/2001 | Chung et al. | 348/370 |
| 6,501,518 B2 * | 12/2002 | Smith et al. | 348/425.3 |

FOREIGN PATENT DOCUMENTS

WO  WO 99/56455  11/1999

* cited by examiner

*Primary Examiner*—Vivek Srivastava
*Assistant Examiner*—Kelly Jerabek

(57) ABSTRACT

An image device, such as a digital camera, detects specific repeating patterns of signal variations by processing columnar information from the device's two-dimensional sensor array used to generate images. In one embodiment, the columnar information is derived from calculating row averages for two image frames, with each row average being a computed average of the multiple signal intensities generated from some or all of the sensors within a particular row. After the columnar information is determined for each of the two frames, a difference signal is generated as a sequence of the differences between the row averages for the first frame and the row averages for the second frame. This row averaging and frame differencing removes a large percentage of the signal energy that is not a result of the artifact of interest, such as the flicker generated by illumination having intensity fluctuations at 100 Hz or at 120 Hz. In some embodiments of the invention, the row averaging and/or the frame-to-frame comparison are deleted.

17 Claims, 5 Drawing Sheets

AUTOMATIC FLICKER FREQUENCY DETECTION DEVICE AND METHOD

TECHNICAL FIELD

The invention relates generally to devices and methods which provide automatic detection of flicker and more particularly to devices and methods which enable discrimination between periodic lighting fluctuations of different frequencies.

BACKGROUND ART

One approach to capturing images is to provide an array of solid state sensors that generate output signals in response to the intensity of light received at the individual sensors over a particular integration time. Thus, the sensors convert photon energy into electrical energy. As one possibility, the sensors may be CMOS image sensors that are arranged in a two-dimensional array to generate image information for display or storage.

A concern is that imaging devices that do not instantaneously capture all of the image information used to form a frame are susceptible to introduction of an image artifact referred to as "flicker." When an imaged scene is illuminated by a fluorescent light source, light intensity is varied periodically in correspondence with the frequency of the alternating current (AC) power, so that flicker is introduced into the image. A fluorescent lighting system that is powered by a source of 60 Hz alternating current will exhibit periodic peaks of intensity at a rate of 120 Hz, i.e., twice the frequency of the alternating current. Thus, unless a digital imaging device includes a mechanism for addressing "beats" at this frequency, an image of a gray background captured under illumination by fluorescent lighting will include readily apparent amplitude modulations of the light intensity in a particular direction (typically the vertical direction), since the light level will vary with the capture of different lines of the image.

Techniques for preventing or removing the artifact from the imaging process are known. A common technique is to set the exposure time to a multiple of the period of the AC power waveform. With the light intensity being integrated over an integer multiple of periods of light fluctuation, the integrated light intensity is constant. For AC power waveforms of 60 Hz, the exposure time should be an integer multiple of 8.33 milliseconds.

Setting the exposure time is effective at eliminating the flicker artifact when the imaging device captures scenes which are illuminated by fluorescent lighting systems which fluctuate at the anticipated frequency. However, in many European countries, the AC power waveform has a frequency of 50 Hz, so that the flicker frequency of concern is 100 Hz. In other countries (e.g., Japan), there are multiple main frequencies (i.e., 50 Hz and 60 Hz). If a digital camera has an exposure time that is set to prevent flicker that would otherwise be introduced by illumination having a particular fluctuation period, flicker will be introduced when the digital camera is exposed to illumination having a longer or a shorter fluctuation period.

U.S. Pat. No. 6,271,884 to Chung et al. describes a digital camera that is able to adapt between use in a 50 Hz lighting environment and use in a 60 Hz lighting environment. The frame rate remains the same, but the integration time is adjustable. The integration time is defined as the amount of time that the electronic component of a particular sensor is allowed to capture light energy for each frame. When the camera is used in an environment having 60 Hz fluorescent lighting, the integration time is set at a multiple of 8.33 millliseconds, but the integration time is changed to a multiple of 10 milliseconds when the environment utilizes 50 Hz fluorescent lighting. When referring to the technique for selecting between the two integration times, the Chung et al. patent states that a typical system requires the user to set the system to define the lighting frequency or may ask the user to view an image display in which an image is generated first at one integration time setting and then at the other integration time setting, so that the user may select the best results. The patent also states that the system could detect the country in which it is operating based on system configuration data or the position of a manual switch that provides for 50 Hz versus 60 Hz lighting. As yet another alternative, the device driver can be placed into a setup mode to monitor "beats" within the intensity of data as provided by a brightness histogram block. By monitoring the beats provided by the brightness histogram block, it can be detected when the camera is being implemented with 50 Hz lighting and an integration time that is not a multiple of 10 milliseconds. The device driver can automatically adjust the integration time to a multiple of 10 milliseconds, if necessary.

Another automatic process is described by Hurwitz et al. in a publication entitled "A Miniature Imaging Module for Mobile Applications," 2001 IEEE International Solid-State Circuits Conference (publication No. 0-7803-6608-5). The publication describes a CMOS imaging device that utilizes a conventional sensor array for forming images and utilizes additional sensors that are dedicated to the detection of flicker. Two array-height "super pixels" border the main sensor array, but are not used to form part of the main image array. The super pixels instead detect vertically averaged lighting variations. The super pixels share the lens and readout with the main array. The super pixel data is interleaved with normal pixel data during free periods within the line. A coprocessor strips out the super pixel data and performs spectral analysis using complex demodulation. Two detectors may be run in parallel, with one detector tuned to 100 Hz and the other detector tuned 120 Hz. Detected energy above a predetermined threshold indicates the presence of flicker at the tuned frequency.

U.S. Pat. No. 5,960,153 to Oster et al. describes automatic detection of the fluorescent lighting period within a particular type of electronic camera. Specifically, the automatic detection is performed within a trilinear charge coupled device (CCD) embodiment in which an image is captured by moving the camera relative to the scene of interest, rather than by holding the camera stationary. The device includes three different linear CCDs positioned side-by-side. Each of the three lines is covered by its own color filter, which typically is in the form of dye that is painted over the sensors within the line. As the camera is moved in a single pass across the image, each linear CCD records a line at a time, until the entire color image is captured. The Oster et al. patent states that to determine the fluctuation period of the lighting, the trilinear array may be maintained in a fixed position for a set period before scanning of the image. During the set period, the fluctuations of the illuminating light are detected by measurement of the integrated light intensity for different integration periods. With the trilinear array being maintained in a fixed position, the fluctuation period may be determined by any known frequency determination method, such as zero crossing determinations, Fourier transformations, and determinations of frequency content at specific frequencies.

The Oster et al. patent also describes fluctuation detection when recording an image by moving the three lines in a single pass across the image. Thus, during the pass across the image, a time-varying intensity fluctuation of the illuminating light is converted, due to the movement of the CCD, into a spatial variation of recorder light intensity. The corresponding spatial frequency may be determined by a spatial frequency analysis of the recorded image.

While the known approaches to switching the integration times on the basis of lighting operate well for their intended purposes, improvements are available. For example, systems that require dedicated sensors for detecting lighting fluctuation frequencies increase the cost of the imaging system. As another example, techniques that operate well within systems having one or more discrete linear arrays (e.g., the trilinear array) may not function as well in systems having two-dimensional arrays of cooperating sensors. What is needed is a device and method which enable cost-efficient automatic discrimination of different frequencies of lighting fluctuations during capture of an image by a two-dimensional array of sensors.

SUMMARY OF THE INVENTION

An imaging device, such as a digital camera, utilizes columnar information from an image-generating two-dimensional array of sensors in order to detect any one of a number of specific repeating patterns of signal variations within the columnar information. The term "columnar information" is defined herein as image information that is associated with sensor outputs in a sequence that is consistent with the columnar direction of the two-dimensional array of sensors. The "columnar direction" is defined herein as being the direction perpendicular to the artifact lines introduced by flicker, and is not by this definition inherently vertical or horizontal, since the orientation of the artifact lines is a function of the techniques for acquiring the image information. The sensors are typically aligned in parallel rows and parallel columns, but this is not critical to the invention.

In a least complex embodiment, the method of performing automatic flicker detection includes acquiring sensor outputs for a single column and a single frame of image information. The column of sensor outputs is analyzed to detect whether the signal contains the specific repeating patterns of intensity variations. The analysis may include techniques such as cross-correlation, Discrete Fourier Transformations, or bandwidth filtering to detect the presence or absence of spatial frequencies corresponding to 100 Hz and 120 Hz.

In a more complex embodiment that is less susceptible to the adverse effects of other sources of information (e.g., image data) in any particular column of the image, each row value within the columnar information is representative of a number of sensor outputs within the corresponding row. That is, the flicker detector includes a row-by-row calculator that is configured to derived the columnar information as a sequence of row values in which each row value is a function of more than one sensor output from a common row. Thus, each row value may be an average of multiple signal intensities generated from some or all of the sensors within a row. Preferably, all of the sensor outputs of each row are utilized, so that the process of forming the columnar information may be viewed as horizontally averaging the image into a single column (or vertically averaging the image into a single column if the image information is being captured in a manner that results in vertical-extending flicker lines). The resulting columnar information of row averages contains the flicker artifact without a reduction in intensity (since flicker does not induce intensity variations along any row) but the averaging tends to reduce the significance of other sources of signal energy, as compared to analyzing information from a single column of the image. As in the first embodiment, the columnar information is analyzed to detect the presence or absence of one or more specific repeating patterns, such as spatial frequencies corresponding to 100 Hz or 120 Hz.

In either of the first two embodiments, the approach to detecting the specific repeating patterns (e.g., fluorescent lighting fluctuations that are determined by the AC waveform of the power source) operates well for images having large areas of image uniformity. For example, if a significant portion or all of the image is a single shade of gray, flicker is readily detected using either approach. However, flicker is more difficult to identify within an image having constant unpredictable variations, such as a captured image of a fluorescent-illuminated portrait of a rock-cluttered mountainside. Within such an image, the desirable image signal may be stronger than the flicker artifact by two or three orders of magnitude. As another complication, some of the desired signal energy has the same spatial frequency as the 100/120 Hz artifacts. Therefore, in a third embodiment of the invention, the row average signal described with reference to the second embodiment is obtained for each of two frames, preferably successive frames. The columnar information of the third embodiment is computed by determining the difference between the corresponding row values for the two row average signals. The columnar information may therefore be considered a difference signal. The difference signal is then analyzed to detect the artifact. This process operates well, since the flicker artifact tends to move from one frame to the next, while the objects within the image exhibit little or no movement. Therefore, most of the desired signal energy in the frames is removed in the process of forming the difference signal (i.e., the columnar information). The difference signal will be composed largely of the energy from the flicker artifact, if flicker is present in the image. Optionally, the frame rate of the imaging device can be varied slightly during the flicker detection process, thereby ensuring that the artifact does shift from one frame to the next frame.

In a fourth embodiment, the difference signal is obtained for two successive frames, but row averaging is not utilized. That is, the columnar information described with reference to the first embodiment is used in the sequence of steps that was described with reference to the third embodiment. As a fifth embodiment, the frame-to-frame comparison is implemented prior to the selection of the columnar information. For example, two frames of a video file (e.g., as in an MPEG coder) can be differenced to derive a difference frame from which the columnar information is determined by row averaging or column selection.

As previously noted, there are a number different available techniques for detecting 100/120 Hz artifacts within the columnar information.

In one approach, a cross-correlation is performed between the columnar information and separate sinusoidal basis functions centered at 100 Hz and 120 Hz. This technique is particularly effective if the cross-correlation is done over an interval of 0.05 seconds (or an integer multiple of 0.05 seconds), since the two basis functions will be perfectly orthogonal. If the sinusoidal basis functions are generated in quadrature, it is possible to detect the phase of the artifact signal. Detecting the phase is useful, since the artifact tends to roll up or down through an imaged scene at a fixed rate.

By knowing in advance how the position of the artifact changes from one frame to the next, the detection may be made more robust in the presence of non-flicker signal energy and movement of objects within the images.

As a second alternative, Discrete Fourier Transformation may be applied to the columnar signal. The advantage of this approach is that Fourier coefficients may be generated at many frequencies, rather than the limitation of 100 Hz and 120 Hz. The coefficients near these two frequencies of interest may aid in rendering reliable determinations of artifact presence. A potential disadvantage of this approach is that the sample interval tends to be rather long, so that the process is time intensive. Other approaches include measuring the distance between zero crossings of the difference signals and/or filtering the columnar information using two very narrow bandpass filters centered at 100 Hz and 120 Hz. The outputs of the filters may then be integrated or a peak detector may be used to reliably identify flicker.

DETAILED DESCRIPTION

Figure 1:
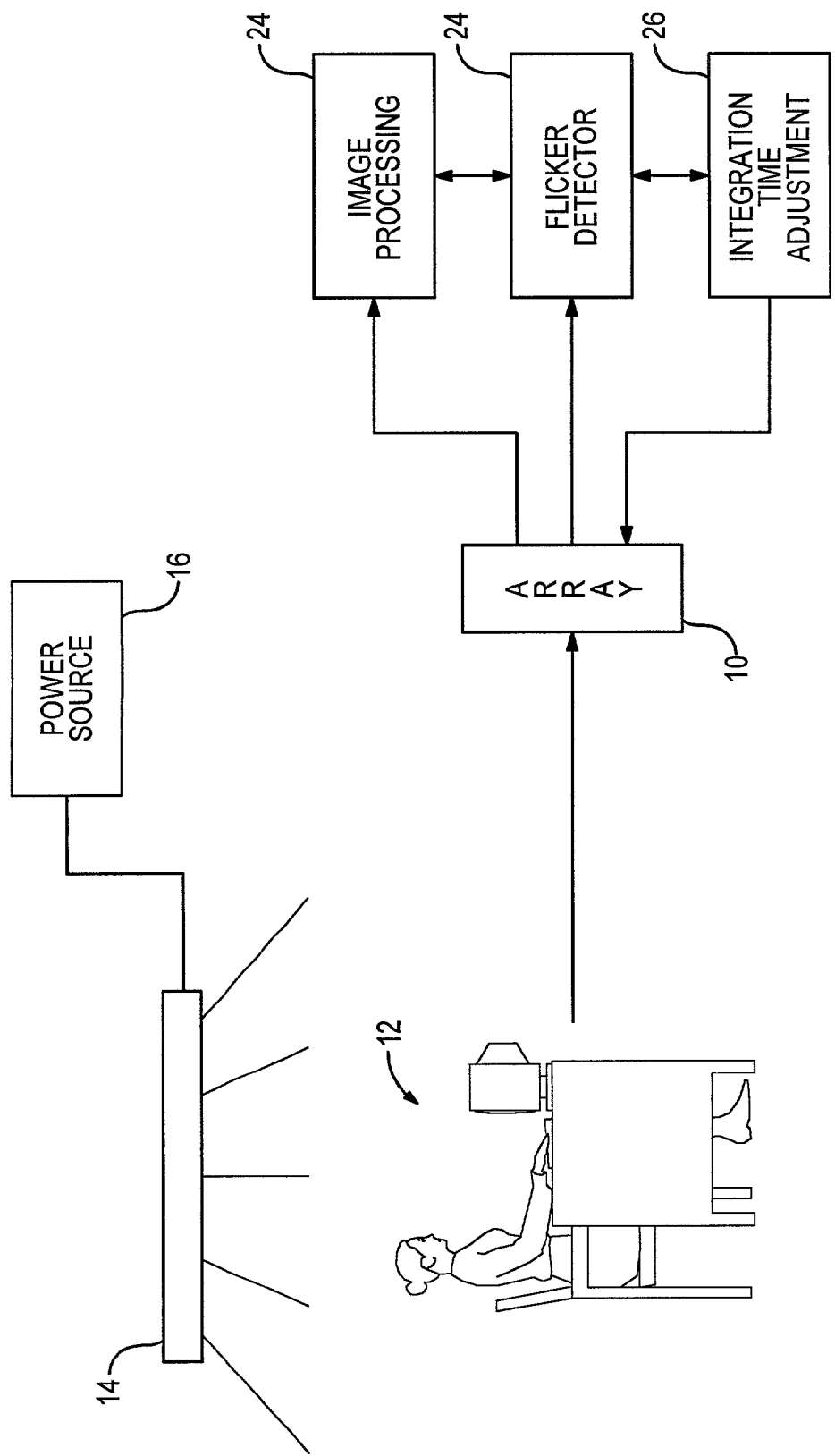
FIG. 1 is an operational view of the invention.

With reference to FIG. 1, a two-dimensional array 10 of sensors is shown as being positioned to generate image information of a scene 12 that includes a person seated at a desk. The scene is shown as being illuminated by a fluorescent lighting system 14 connected to a power source 16. As is known in the art, the lighting system is subject to periodic fluctuations in illumination intensity. For example, if the power source has an output of a 60 Hz waveform, the fluorescent lighting system will have intensity peaks of 120 Hz. On the other hand, if the output of the power source is a 50 Hz waveform, the intensity peaks of the lighting system will be 100 Hz. While the invention will be described with reference to use of a fluorescent lighting system, the techniques may be used with other lighting systems that exhibit periodic intensity variations.

Figure 2:
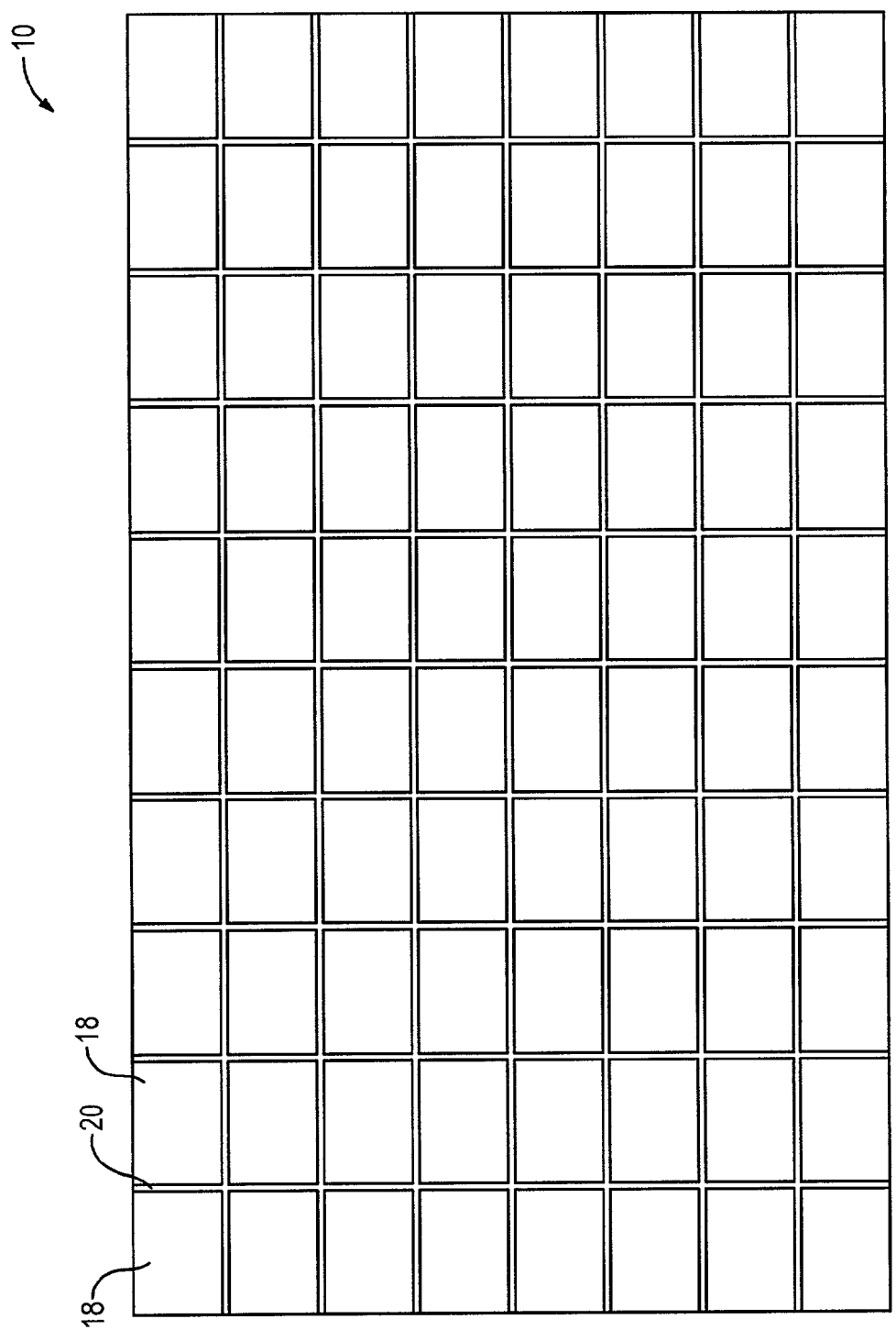
FIG. 2 is a front view of an example of a two-dimensional array of sensors of FIG. 1.

An example of the two-dimensional array 10 is shown in FIG. 2. The array may be of the type used in commercially available digital cameras, such as CMOS-based systems. The array includes m horizontal rows and n vertical columns of discrete sensors 18. Adjacent sensors are spaced apart by gaps 20 through which read lines may be fabricated to sequentially conduct sensor outputs to image processing circuitry 22 shown in FIG. 1. Neither the number of sensors in a row nor the number of sensors in a column is critical to the invention. Moreover, while sequential image acquisition from the array (e.g., sequencing the exposure and read times of the different lines of sensors within the array) is typically carried out by sequencing the horizontal lines of sensors, persons skilled in the art will recognize that the vertical lines of sensors may be sequenced. In the applications in which the vertical lines are sequenced, the description of the invention should be considered as having horizontal columns and vertical rows.

In some digital cameras, the m rows of sensors 18 within the array 10 are sequentially exposed by the operation of a rolling shutter. In other applications, the same effect occurs because the rows are sequentially read in a manner that provides rolling integration times for the different rows. In either one of these applications, the result is that there will be row-to-row differences in signal intensity as a result of the periodic fluctuations of the fluorescent lighting system 14. In FIG. 1, the system includes a flicker detector 24 that is used to determine the periodicity of the lighting fluctuations. Based upon this identification, an integration time adjustment mechanism 26 is controlled to reduce the effects of flicker. For example, the integration time of the sensors 18 may be set as a multiple of 8.33 milliseconds when the lighting system 14 is controlled by a 60 Hz power source 16, but the integration time may be set as a multiple of 10 milliseconds when the power source is a 50 Hz source. However, the adjustment of the integration time is not a necessary component of the invention, since other approaches to controlling the detected flicker may be substituted.

Figure 3:
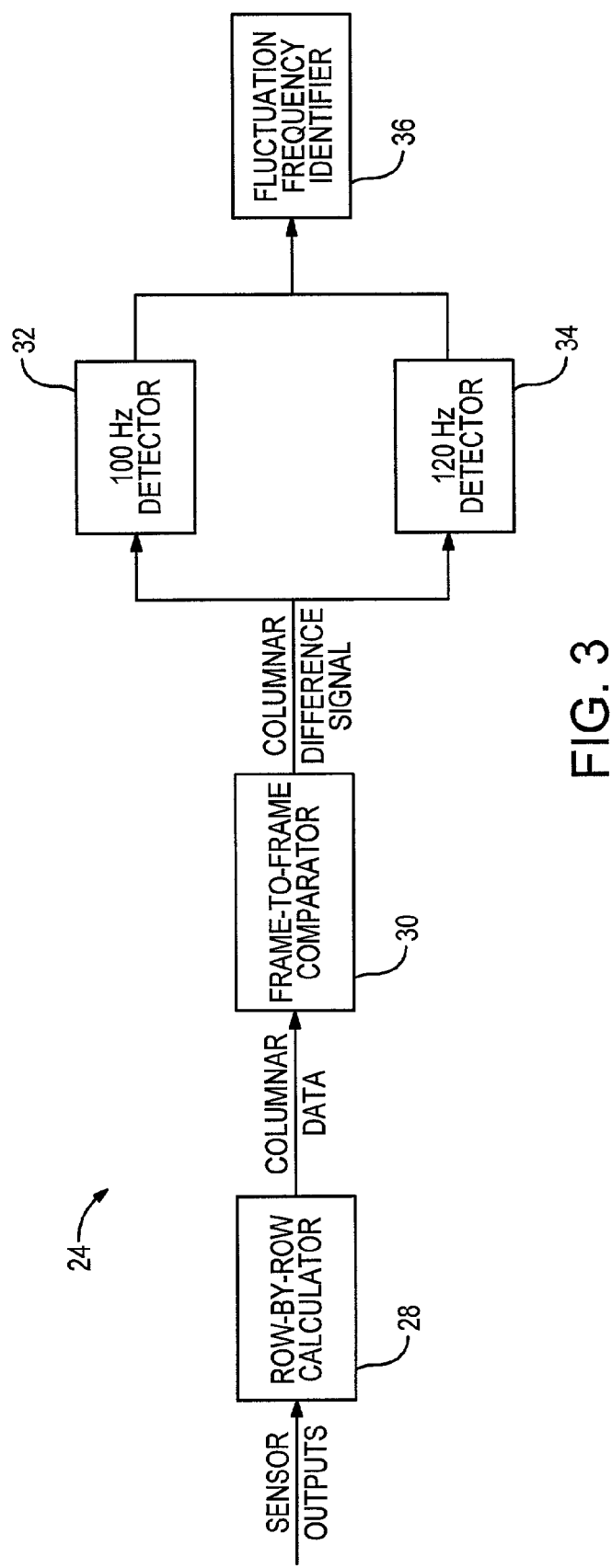
FIG. 3 is a block diagram of the components of the flicker detector in accordance with one embodiment of the invention.

FIG. 3 illustrates one embodiment of the flicker detector 24. The embodiment of FIG. 3 is the most robust of the different embodiments that will be identified below. In this embodiment, the sensor outputs from the two-dimensional array of sensors are received at a row-by-row calculator 28. The calculator is configured to derive columnar information as a function of more than one sensor output from each row that is considered in forming the columnar information. Referring to FIG. 2, the calculator 28 may consider each of the n sensors 18 within each row and may consider all m rows. However, this is not critical. For example, if the array 10 includes 480 rows, the calculator may sample only sensor outputs from every tenth row to provide 48 samples. As another aspect that reduces computational complexity, not all of the sensors within a row that is sampled may be used in determining the row value for that row. While not critical, the row value is preferably an average of the various signal intensities of sensors polled within the row. Thus, if all of the sensor outputs are considered by the row-by-row calculator 28, the columnar information that is output from the calculator may be viewed as a horizontal averaging of the image into a single column (or vertically averaging the image into a single column if the image information is being captured in a manner that results in vertical-extending flicker lines). The averaging results in columnar information that contains the flicker artifact, but is likely to contain less non-flicker signal energy than any single column of sensor outputs.

The adverse effects of such non-flicker signal energy can be further reduced by the operation of a frame-to-frame comparator 30. The comparator determines the difference between the columnar information of two frames, preferably successive frames. The output of the comparator is a difference signal that is computed by determining the difference between the corresponding rows of the two row-average signals for the two frames. That is, the columnar information that is output by the comparator may be considered to be a "difference signal," since it is computed by calculating row-by-row differences. The use of the difference signal from the comparator operates well, since the flicker artifact tends to move from one frame to the next, but the objects within the image exhibit little or no movement, so that the object information is cancelled by the differencing operation. The non-cancelled information will be composed largely of the energy from the flicker artifact, if flicker is present in the image. For the purpose of ensuring the artifact shifts in successive frames, the frame rate can be varied slightly during the flicker detection process.

The flicker detector 24 of FIG. 3 is shown as having three separate components 32, 34 and 36 that provide the 100/120 Hz detection and identification, but separate components are not critical to the operation. In one possible application, the components are a 100 Hz bandpass filter 32, a 120 Hz bandpass filter 34, and a peak detector 36. Thus, each of the filters rejects frequencies significantly above or below the frequency of interest. The outputs of the filters are directed to the identifier 36, which determines whether flicker exists, and if so at which frequency. As will be explained more fully below, an alternative application of the three components enables cross-correlation between the columnar difference signal from the comparator 30 and a pair of sinusoidal basis functions. A 100 Hz sinusoidal basis function is used at the detector 32, while a 120 Hz sinusoidal basis function is applied at the detector 34. As another possibility, the frequency detection and identification may be performed using Discrete Fourier Transformation of the difference signal. Still another possibility is to measure the distance between zero crossings of the difference signal from the comparator 30. If non-flicker signal energy is a concern, the difference signal can be filtered using a 100–120 Hz bandpass filter before the zero detection occurs.

In an alternative embodiment of the flicker detector 24 of FIG. 3, the row-by-row calculator 28 and the frame-by-frame comparator 30 are replaced with a mechanism which acquires sensor outputs from a single column of the sensor array 10 in FIG. 2. While the selection of the column is not critical, it may be better to select an off-center column, since there may be less image information at the flicker frequency and more background uniformity away from the center of the image. No frame-to-frame comparison occurs in this embodiment.

In another embodiment, the row-by-row calculator 28 is deleted, but the frame-to-frame comparator is employed. Thus, the sensor outputs from a single column are obtained for two frames and a columnar difference signal is determined as a sequence of the differences between row values of the first frame and the row values of the second frame. In this embodiment, the selection of the sensor column to be considered is less important, since the frame-to-frame differencing removes the imaged-object signal energy from the columnar information.

In yet another embodiment, the row-by-row calculator 28 is employed, but the comparator 30 is deleted. Thus, the process of forming the columnar information that is analyzed to detect the presence or absence of flicker may be viewed as averaging a frame of information into a single column.

While the less complex embodiments provide desired results, the most preferred embodiment is the one that includes the calculator 28 and the comparator 30. However, the order is not critical, since the frame-to-frame comparison may occur prior to determining the columnar information by row averaging or by any other process. For some video formats, there may be an advantage to providing the frame differencing prior to the determination of the columnar information.

Figure 4:
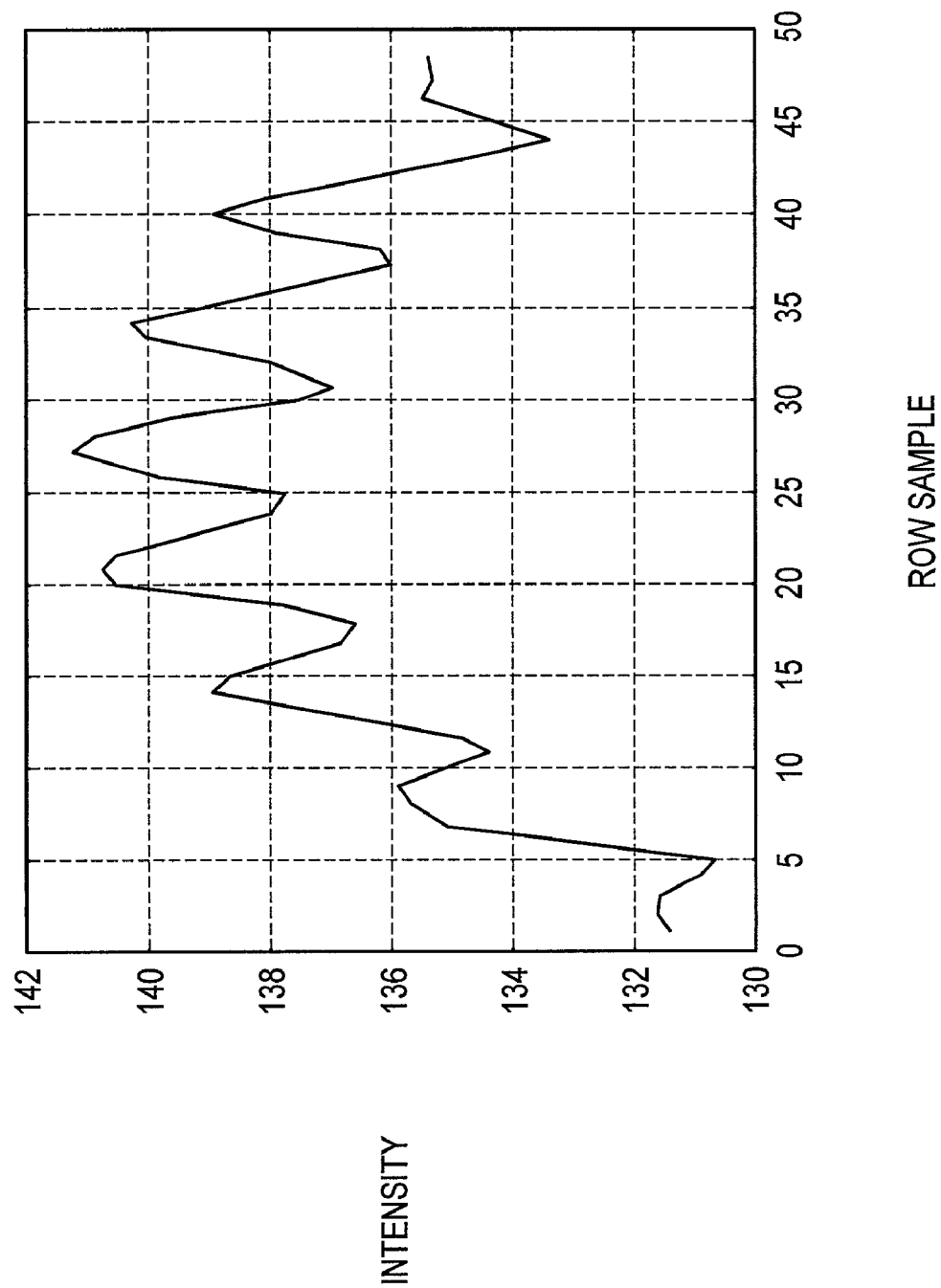
FIG. 4 is a waveform as an example of an output of the row-by-row calculator of FIG. 3.

The operations of the embodiment of FIG. 3 will be described with reference to FIGS. 4–7. In FIG. 4, an example of an output of the row-by-row calculator 28 is shown for flicker contained within a uniformly shaded gray image. Since the desired gray information is uniform throughout the image, the variations are a result of the flicker. The array included 480 rows of sensors, but only every tenth sensor was sampled. Therefore, only 48 samples are shown in the x direction of the waveform of FIG. 4. For each sample, the intensity was calculated as an average of the RGB (red, green and blue) amplitudes for the 48 rows that corresponded to the samples. The waveform shows the recurring peaks and valleys that were introduced by the fluctuation of the illumination source.

Figure 5:
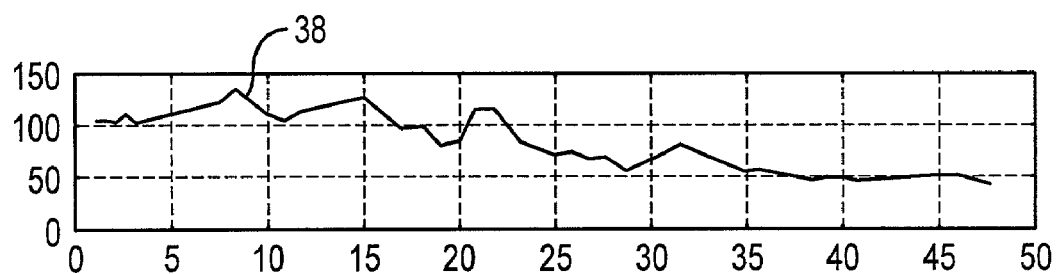
FIGS. 5 and 6 are example waveforms of successive frames, representing input to the frame-to-frame calculator of FIG. 3.
Figure 6:
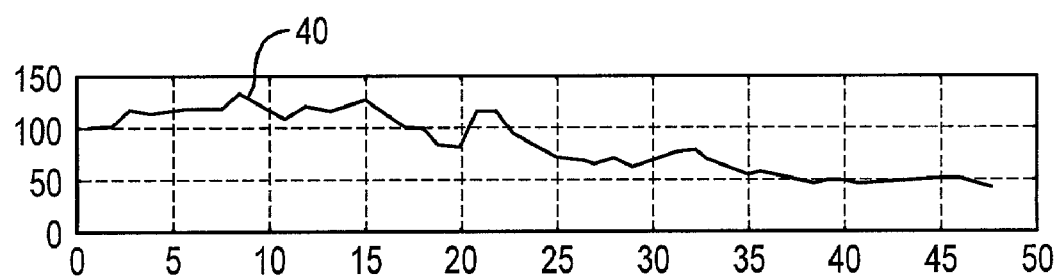

As previously noted, the flicker artifact is less evident in images of scenery that is less uniform, such as a captured image of a fluorescent-illuminated portrait of a rock-cluttered mountainside. With reference to FIG. 5, 48 samples provide the columnar information 38 that is the first output of the row-by-row calculator 28 in FIG. 3. The waveform 38 may be stored at the frame-to-frame comparator 30 until a second frame for the same scene has been sampled to provide a second instance of columnar information, such as the waveform 40 of FIG. 6. The comparator 30 determines the differences between the samples. The comparator may also convert the waveform to one in which frequency can be identified.

Figure 7:
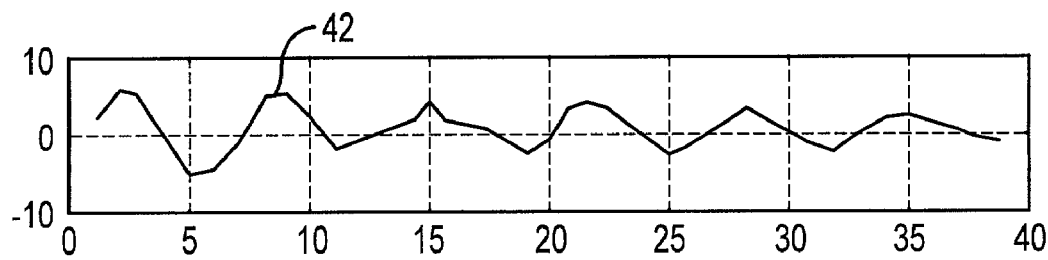
FIG. 7 is a difference signal computed by the frame-to-frame calculator for the two waveforms of FIGS. 5 and 6.

The waveform 42 of FIG. 7 represents a difference signal which may be directed through a 100 Hz bandpass filter 32 and a 120 Hz bandpass filter 34. If the fluctuation frequency identifier 36 is a peak detector or a zero-crossing detector, the frequency of the fluctuations within waveform 42 may easily be identified from waveform 44.

Rather than using zero crossing determinations or bandpass filtering, the detection of the frequency of the artifact may be achieved by providing Discrete Fourier Transformations of the difference signal. An advantage of this approach is that it is possible to generate Fourier coefficients at the frequencies adjacent to 100 Hz and 120 Hz. The neighboring coefficients may be useful in increasing the reliability of the decision. The potential disadvantage is that the sample interval needs to be relatively long, so that the process is potentially slower than the frame rate of the imaging system.

The cross-correlation approach is another possibility, as previously noted. The cross-correlation approach is particularly effective if the cross-correlations are done over intervals of 0.05 seconds, so that the two basis functions at 100 Hz and 120 Hz are perfectly orthogonal. If the basis functions are generated in quadrature, it is possible to detect the phase of the artifact signal. Phase detection is useful because the artifact rolls up and down through the scene at a fixed rate. By knowing in advance how much the phase of the artifact changes in one frame to the next, the detection may be made more robust in the presence of image information and movement in the image.

What is claimed is:

1. An imaging device comprising:
   an imaging array of sensors arranged in a two-dimensional region having a columnar dimension and a perpendicular second dimension, said sensors having sensor outputs that are responsive to light intensities;
   signal processing in communication with said array to receive said sensor outputs and to integrate said sensor outputs as image frames; and
   a flicker detector coupled to receive columnar information of said array and configured to detect any one of a plurality of specific repeating patterns of intensity variations within said columnar information, said columnar information being a subset of said sensor outputs and being associated with both a plurality of said sensor outputs in a sequence consistent with said columnar dimension and a plurality of said sensor outputs in said second dimension, each said specific repeating pattern being indicative of a selected periodic fluctuation in source lighting, said flicker detector further includes a frame-to-frame comparator configured to output a columnar difference signal that is a function of differences between said columnar information of a first image frame and said columnar information of a second image frame, said flicker detector having an analyzer configured to detect any one of said specific repeating patterns within said columnar difference signal.

2. The imaging device of claim 1 wherein said sensors are positioned in rows and columns and wherein said flicker detector includes a row-by-row calculator configured to derive said columnar information as a sequence of row values in which each row value is a function of a plurality of said sensor outputs that are generated by sensors within a particular row corresponding to said row value.

3. The imaging device of claim 2 wherein said row-by-row calculator is configured to calculate an average of said sensor outputs in determining each said row value.

4. The imaging device of claim 1 wherein said analyzer is connected to receive said columnar difference signal and is configured to apply a plurality of sinusoidal basis functions to said difference signal in a Cross-correlation operation, each said sinusoidal basis function corresponding to one of said specific repeating patterns, said specific repeating patterns being indicative of 50 Hz and 60 Hz fluctuations in said source lighting.

5. The imaging device of claim 4 wherein said analyzer is configured to generate said sinusoidal basis functions in quadrature to detect a phase of artifacts introduced into said first and second image frames as a consequence of said fluctuations in said source lighting.

6. The imaging device of claim 1 wherein said analyzer is connected to receive said columnar difference signal and is configured to generate Discrete Fourier Transforms for said columnar difference signal.

7. The imaging device of claim 1 wherein said analyzer is connected to receive said columnar difference signal and is configured to detect said selected periodic fluctuations as a function of zero crossings by said columnar difference signal.

8. The imaging device of claim 1 wherein said analyzer is connected to receive said columnar difference signal and is configured to detect said periodic fluctuations by filtering said columnar difference signal at a plurality of frequencies, including 100 Hz and 120 Hz.

9. The imaging device of claim 1 wherein said signal processing is configured to implement variations in frame rate when in a flicker detection mode, said variations being selected to provide frame-to-frame shifts in locations of flicker artifacts from said first image frame and said second image frame.

10. The imaging device of claim 1 wherein said frame-to-frame comparator is positioned to derive a difference frame that is a function of differences between first and second frames of said image signals, said columnar information being determined from said difference frame.

11. A method of processing image information comprising the steps of:
exposing a two-dimensional array of sensors to a scene of interest in a row-by-row fashion, such that any periodic fluctuations in scene lighting introduce flicker artifacts in a columnar direction;
reading sensor outputs from said array to form at least two frames of image information; and
detecting said flicker artifacts in at least one said frame by defining a sequence of row values in which said sequence has a correspondence with said columnar direction of said array and by determining whether said sequence contains selected spatial frequencies that are indicative of said period fluctuations, said detecting further including forming a difference signal that is a function of differences between a first said sequence derived from a first said frame and a second said sequence derived from a second said frame.

12. The method of claim 11 wherein said step of detecting includes:
deriving said sequence as a function of calculating a representative row value for each of a plurality of rows in said array of sensors, each said representative row value being a function of a plurality of said sensor outputs read from sensors in a single said row; and
determining whether said sequence has spatial frequencies indicative of 50 Hz or 60 Hz lighting fluctuations.

13. The method of claim 12 wherein said step of detecting further includes applying cross-correlation between said difference signal and each one of a first sinusoidal basis function related to said 50 Hz lighting fluctuation and a second sinusoidal basis function related to said 60 Hz lighting fluctuation.

14. The method of claim 12 wherein said step of detecting further includes at least one of (a) performing Discrete Fourier Transformations of said difference signal. (b) detecting zero crossings by said difference signal and (c) performing bandpass filtering centered at 100 Hz and 120 Hz.

15. A method of processing image information comprising the steps of:
providing successive first and second frames of image information, each said frame having a row direction and a column direction;
calculating first averages of signal levels for each row of said first frame;
calculating second averages of signal levels for each row of said second frame;
forming a difference signal representative of differences between said first averages and said second averages, said difference signal being a data sequence that corresponds with a sequence of rows of data within said frames; and
detecting artifacts indicative of periodic lighting fluctuations during said forming of said first frame and during said forming of said second frame.

16. The method of claim 15 wherein said step of detecting artifacts includes determining whether said difference signal includes spatial frequencies of 100 Hz or 120 Hz.

17. The method of claim 16 wherein said step of detecting artifacts includes performing cross-correlations between said difference signal and sinusoidal basis functions that correspond to spatial frequencies.

* * * * *